(12) United States Patent
Nakata et al.

(10) Patent No.: US 7,988,206 B2
(45) Date of Patent: Aug. 2, 2011

(54) FLARELESS-TYPE PIPE FITTING, REFRIGERATING DEVICE, AND WATER-HEATING DEVICE

(75) Inventors: Haruo Nakata, Sakai (JP); Akira Hashimoto, Sakai (JP); Seiji Chazono, Sakai (JP); Yoshiki Murayama, Sakai (JP)

(73) Assignee: Daikin Industries, Ltd., Osaka-shi (JP)

( * ) Notice: Subject to any disclaimer, the term of this patent is extended or adjusted under 35 U.S.C. 154(b) by 0 days.

(21) Appl. No.: 12/523,153

(22) PCT Filed: Feb. 28, 2008

(86) PCT No.: PCT/JP2008/053477
§ 371 (c)(1),
(2), (4) Date: Jul. 14, 2009

(87) PCT Pub. No.: WO2008/114590
PCT Pub. Date: Sep. 25, 2008

(65) Prior Publication Data
US 2010/0090457 A1    Apr. 15, 2010

(30) Foreign Application Priority Data
Mar. 19, 2007 (JP) .................................. 2007-071056

(51) Int. Cl.
*F16L 19/08* (2006.01)
(52) U.S. Cl. ............................. 285/343; 285/342; 285/3
(58) Field of Classification Search ............... 285/3, 323, 285/249, 342, 343
See application file for complete search history.

(56) References Cited

U.S. PATENT DOCUMENTS

| | | | | |
|---|---|---|---|---|
| 1,983,840 A | * | 12/1934 | Dohner | 285/341 |
| 2,150,042 A | * | 3/1939 | Shultz | 285/341 |
| 2,544,109 A | * | 3/1951 | Richardson | 285/3 |
| 2,553,981 A | * | 5/1951 | Richardson | 285/3 |
| 3,025,084 A | * | 3/1962 | Franck | 285/3 |
| 3,290,062 A | * | 12/1966 | Ziherl et al. | 285/3 |
| 3,708,186 A | * | 1/1973 | Takagi et al. | 285/341 |
| 3,743,324 A | * | 7/1973 | Schwarz et al. | 285/3 |
| 3,888,521 A | * | 6/1975 | O'Sickey | 285/341 |
| 4,022,497 A | * | 5/1977 | Kotsakis | 285/4 |
| 4,556,242 A | * | 12/1985 | Kowal et al. | 285/341 |
| 4,944,534 A | | 7/1990 | Kotyk | |
| 2004/0140671 A1 | | 7/2004 | Williams et al. | |

(Continued)

FOREIGN PATENT DOCUMENTS

CN  1823240 A  8/2006

(Continued)

*Primary Examiner* — David E Bochna
(74) *Attorney, Agent, or Firm* — Birch, Stewart, Kolasch & Birch, LLP

(57) ABSTRACT

In a flareless-type pipe joint, a pressing surface, which presses a rear end portion of a ferrule in the axial direction and toward the inner periphery of the ferrule, is formed in a joint body or a coupling member in which a cam surface is not formed. The ferrule has a groove that extends radially outward from the inner periphery. By pressing the rear end portion in the axial direction and toward the inner periphery by the pressing surface, the distal portion of the ferrule is pressed against the cam surface and an edge portion of the distal portion is deformed to bite into a pipe. An edge portion of a rear end portion of the inner peripheral surface of the ferrule is deformed to bite into the pipe.

5 Claims, 11 Drawing Sheets

U.S. PATENT DOCUMENTS

2006/0244257 A1  11/2006  Asakawa et al.

FOREIGN PATENT DOCUMENTS

| | | |
|---|---|---|
| EP | 1 471 297 A2 | 10/2004 |
| JP | 45-27949 | 10/1970 |
| JP | 49-3111 | 1/1974 |
| JP | 52-123321 | 9/1977 |
| JP | 62-204086 U | 12/1987 |
| JP | 2001-355942 A | 12/2001 |
| JP | 2004-526911 A | 9/2004 |
| JP | 2005-337326 A | 12/2005 |
| WO | WO 02/063195 A2 | 8/2002 |

* cited by examiner

FLARELESS-TYPE PIPE FITTING, REFRIGERATING DEVICE, AND WATER-HEATING DEVICE

TECHNICAL BACKGROUND

The present invention relates to a flareless-type pipe joint and to a refrigerating device and a water-heating device employing the flareless-type pipe joint, and, more particularly, to a pipe holding structure using a ferrule.

BACKGROUND ART

A detachable pipe joint is often used as a pipe joint for a fluid pipe in which fluid flows so that the pipe joint can be detached when the pipe or the fluid supply pipe deteriorates. Detachable pipes are configured in various manners depending on their purposes.

Conventionally, a flare type pipe joint, for example, has been often used as a pipe joint for a refrigeration cycle apparatus having a fluid pipe in which fluid flows, such as an air conditioner. However, in refrigeration cycle apparatuses, change of refrigerants is promoted to protect the global environment. Specifically, conventional chlorofluorocarbon refrigerants are being replaced by HC refrigerants such as propane, ethane, ethylene, n-pentane, n-butane, or isobutane refrigerants or, when high pressure is used, natural refrigerants such as carbon dioxide. This has encouraged the development of flareless-type pipe joints as pipe joints with low refrigerant leakage for the refrigerating circuit apparatuses employing the new refrigerants.

A pipe joint described in Patent Document 1 is an example of flareless-type pipe joints. The pipe joint holds a pipe to be joined and seals the joint portion using a single ferrule.

As illustrated in FIG. 14(*a*), the flareless-type pipe joint has a joint body 101 having a pipe connecting port 101*a* and a cap-nut-like coupling member 103 having a through hole 103*a*, which is formed at the center of the coupling member 103. A distal portion of a pipe 102, which is to be joined, is passed through the pipe connecting port 101*a*. The pipe 102 extends through the through hole 103*a*. An annular ferrule 105 is connected to a base 103*b* of the coupling member 103 through a thin portion 104 extending in a radial direction of the coupling member 103. The ferrule 105 and the coupling member 103 are formed integral with each other through the thin portion 104. A cam surface 106, which guides the distal portion of the ferrule 105 to bite into the pipe 102, is formed at the inlet of the pipe connecting port 101*a* of the joint body 101.

A pressing surface 108, which presses a rear end surface 105*a* extending from the ferrule 105 to the thin portion 104 through a space 107, is formed in the coupling member 103 with respect to the rear end surface 105*a*. When the pipe 102 is joined with the pipe joint, the distal portion of the ferrule 105 is pressed against the cam surface 106 by the fastening force produced by fastening the coupling member 103. By fastening the coupling member 103 further in this state, axial force acts on the thin portion 104, as illustrated in FIG. 14(*b*), and the thin portion 104 is cut. This separates the ferrule 105 from the coupling member 103, and the ferrule 105 operates as an independent ferrule. Further, the pressing surface 108 presses the rear end surface 105*a*. When the fastening force of the coupling member 103 is applied to the rear end surface 105*a* of the ferrule 105 through the pressing surface 108, a tapered surface 105*b* of the distal portion of the ferrule 105 is pressed against the cam surface 106 and the distal portion of the ferrule 3 is guided by the cam surface 106 to bite into the pipe 102. As a result, the distal portion of the ferrule 105 bites into the pipe 102, as illustrated in FIG. 14(*c*), thus joining the pipe 102 in an airtight state.

To airtightly join the pipe 102, the flareless-type pipe joint must reliably exert holding function of the pipe 102 and sealing function of an insertion portion of the pipe. In the conventional flareless-type pipe joint, the two functions are brought about as follows. The pipe holding function is ensured by pressing the distal portion of the ferrule 105 against the cam surface 106 to cause the distal portion to bite into the pipe 102. The sealing function of the insertion portion of the pipe 102 is achieved by biting of the distal portion of the ferrule 105 into the outer peripheral surface of the pipe 102 and tight contact between the tapered surface 105*b*, which is the outer peripheral surface of the distal portion of the ferrule 105, and the cam surface 106. That is, the important two functions of the flareless-type pipe joint are exerted by appropriate biting of the distal portion of the ferrule 105 and appropriate tight contact between the distal portion of the ferrule 105 and the cam surface 106.

Patent Document 1: Japanese National Phase Laid-Open Patent Publication No. 2004-526911

SUMMARY OF THE INVENTION

After the airtight joint of the pipe 102 is accomplished through deformation of the distal portion of the ferrule 105, such joint may be broken. Specifically, the pipe 102 is likely to receive vibration of the device to which the pipe 102 is joined or an impact or vibration from an external source. In the above-described conventional joint state, the vibration and the impact are transmitted to the tight contact portion between the bite-in portion of the distal portion of the ferrule 105 and the cam surface 106 through the pipe 102. As a result, when the transmitted vibration or impact is great, the sealing function and the pipe holding function brought about through deformation of the distal portion of the ferrule 105 may be hampered.

Accordingly, an objective of the present invention is to provide a flareless-type pipe joint capable of holding a pipe also at a rear end portion of a ferrule so as to prevent sealing function and pipe holding function, which are brought about by deformation of the ferrule, from being hampered after joint of the pipe, and to provide a refrigerating device and a water-heating device employing the flareless-type pipe joint.

To achieve the foregoing objective and in accordance with a first aspect of the present invention, a flareless-type pipe joint including a joint body having a pipe connecting port through which a pipe to be joined is passed, a coupling member fastened to the joint body, an annular ferrule, and a cam surface guiding a distal portion of the ferrule to bite into the pipe is provided. The cam surface is formed in at least one of the joint body and the coupling member. A pressing surface is formed in the joint body or the coupling member in which the cam surface is not provided. The pressing surface presses a rear end portion of the ferrule in an axial direction and toward an inner periphery of the ferrule. The ferrule has a groove that extends outward in a radial direction from an inner periphery of the ferrule in such a manner as to divide the ferrule into a front portion and a rear portion. The distal portion of the ferrule is pressed against the cam surface by pressing the rear end portion of the ferrule in the axial direction and toward the inner periphery by means of the pressing surface, so that an edge portion formed in the distal portion of the ferrule and an edge portion provided in a rear end portion of an inner peripheral surface of the ferrule bite into the pipe.

In this structure, when the rear end portion of the ferrule is pressed in the axial direction, while being pressed radially inward, or toward the axis, by the pressing surface, the front portion of the ferrule about a groove is easily bent in the direction in which the distal portion of the ferrule bites into the pipe. This facilitates deformation of the rear portion of the ferrule about the groove in which the rear end portion bites into the pipe. The edge portions formed in the distal portion and the rear end portion of the ferrule are thus caused to bite into the pipe. Accordingly, vibration and an impact transmitted through the pipe are attenuated by the biting portion of the edge portion of the rear end portion of the ferrule before reaching the portion of the edge portion of the distal portion of the ferrule that bites into the pipe. As a result, the pipe holding function and pipe sealing function through biting of the distal portion of the ferrule are reliably maintained by pipe holding function through biting of the rear end portion of the ferrule.

In the above describe aspect, it is preferable that the rear end portion of the ferrule is connected integrally, through a radially extending thin portion, to a base of the joint body or the coupling member in which the cam surface is not provided. In this structure, a space is defined between the rear end surface of the ferrule and the pressing surface. In the flareless-type pipe joint, when the joint body and the coupling member are fastened together, the thin portion is cut by the axial force produced by fastening the joint body and the coupling member after the distal portion of the ferrule contacts the cam surface. After the thin portion is cut, the ferrule operates as an independent ferrule.

In this structure, the flareless-type pipe joint is used as a pipe joint formed integrally with a ferrule, and the above-described advantages are obtained. Specifically, since the edge portion of the distal portion of the ferrule and the edge portion of the rear end portion of the inner peripheral surface of the ferrule each bites into the pipe, the vibration and the impact transmitted through the pipe are attenuated by the biting portion of the rear end portion of the ferrule before reaching the biting portion of the distal portion of the ferrule. As a result, the pipe holding function and the pipe sealing function through biting of the distal portion of the ferrule are securely maintained by the pipe holding function through biting of the rear end portion of the ferrule.

In the above described aspect, the groove is preferably shaped in such a manner that, when the edge portion of the distal portion of the ferrule and the edge portion of the rear end portion of the inner peripheral surface of the ferrule are being deformed to bite into the pipe, front and rear surfaces defining the groove contact each other at the entire surfaces or parts of the surfaces. In this structure, the front surface and the rear surface defining the groove contact each other by the entire surfaces or parts of the surfaces when the ferrule is being deformed, thus preventing the edge portion of the rear end portion of the ferrule from biting excessively. This prevents the refrigerant flow resistance from being increased by excessive deformation of the rear end portion of the ferrule.

In the above described aspect, the ferrule preferably has a cutout that allows the distal portion of the ferrule to be easily deformed by an axial pressing force produced by manually fastening the joint body and the coupling member together. In this case, the flareless-type pipe joint is configured in such a manner as to temporarily hold the pipe to be joined by pressing the wedge-like portion, which is located distally with respect to the cutout, into the pipe. In this structure, the pipe is temporarily held before the coupling member must be fastened by the fastening tool. Accordingly, afterwards, the coupling member is efficiently fastened using the fastening tool.

In accordance with another aspect of the present invention, a refrigerating device in which the above described flareless-type pipe joint is employed in a refrigerant circuit, in a water supply circuit, or in both of the refrigerant circuit and the water supply circuit is provided. In accordance with a further aspect of the present invention, a water-heating device in which the above described flareless-type pipe joint is employed in a hot water supply circuit, in a water supply circuit, or in both of the hot water supply circuit and the water supply circuit is provided. These structures enhance sealing performance and durability of the pipe joint, and improve the reliability of the product.

BRIEF DESCRIPTION OF THE DRAWINGS

FIG. 6(a) illustrates a state in which a pipe is temporarily held by a wedge-like portion of a distal portion of the ferrule, FIG. 6(b) illustrates a state after the ferrule has been separated, and FIG. 6(c) illustrates a state after fastening;

FIG. 7(a) illustrates a state in which the biting amount of an edge of a rear end portion is adequate, and FIG. 7(b) illustrates a state after fastening;

FIG. 12(a) illustrates a state in which a pipe is temporarily held by a wedge-like portion of a distal portion of the ferrule, FIG. 12(b) illustrates a state after the ferrule has been separated, and FIG. 12(c) illustrates a state after fastening;

FIG. 14(a) illustrates a state before separation in which a distal portion of a ferrule contacts a cam surface, FIG. 14(b) illustrates a state in which a thin portion has been cut and a pressing surface presses a rear end portion, and FIG. 14(c) illustrates a state after joint of the pipe.

BEST MODE FOR CARRYING OUT THE INVENTION

Figure 1:
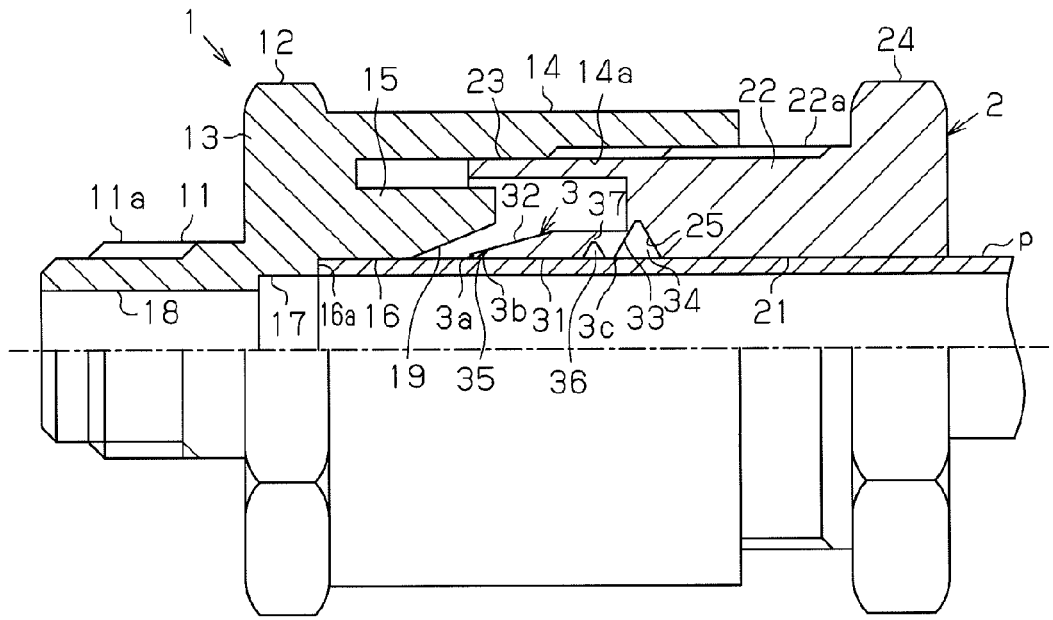
FIG. 1 is a cross-sectional view showing a portion of a flareless-type pipe joint according to a first embodiment of the present invention, illustrating an assembled state before fastening.

Embodiments of the present invention will now be described with reference to the attached drawings. Same or like reference numerals will be given to components of second to fifth embodiments that are the same as or like corresponding components of a first embodiment and description of the components will be omitted or simplified herein.

First Embodiment

A pipe joint according to a first embodiment will be explained with reference to FIGS. 1 to 6. The pipe joint of the first embodiment is a flareless-type pipe joint used in a refrigerant circuit of a refrigerating device or a heat pump type water-heating device. As illustrated in FIG. 1, the flareless-type pipe joint has a joint body 1 attached to an interconnecting device, a coupling member 2 arranged around a pipe p to be joined with the joint body 1, and a ferrule 3 formed integrally with the coupling member 2. In the following description, the forward and rearward directions correspond to the leftward and rightward directions in FIG. 1, respectively. Specifically, the forward direction corresponds to the leftward direction in FIG. 1 and the rearward direction corresponds to the rightward direction in FIG. 1.

Figure 2:
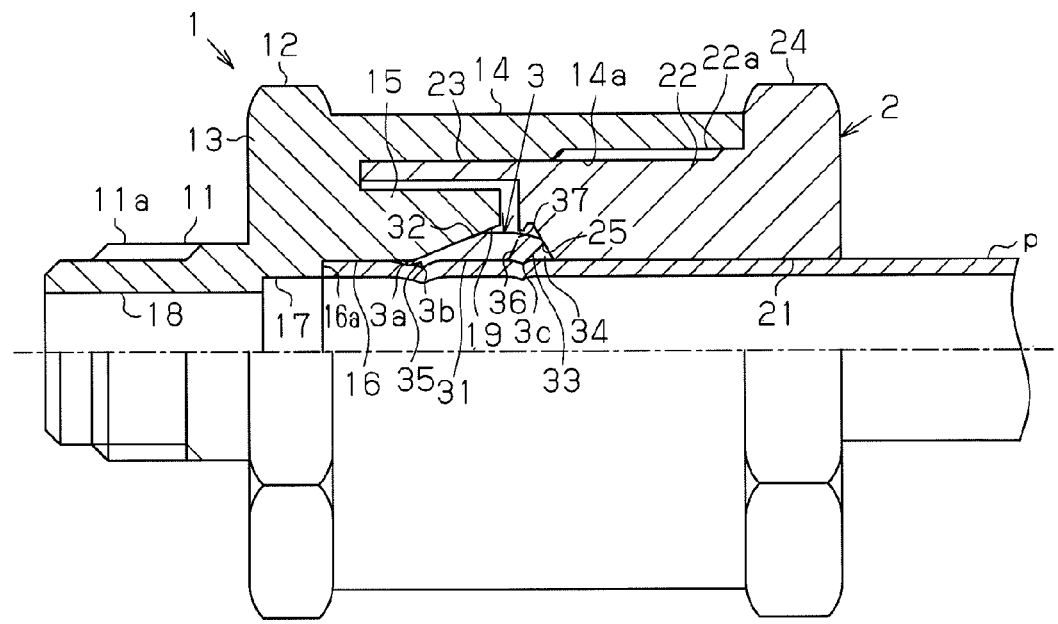
FIG. 2 is a cross-sectional view showing a portion of the flareless-type pipe joint, illustrating an assembled state after fastening.
Figure 3:
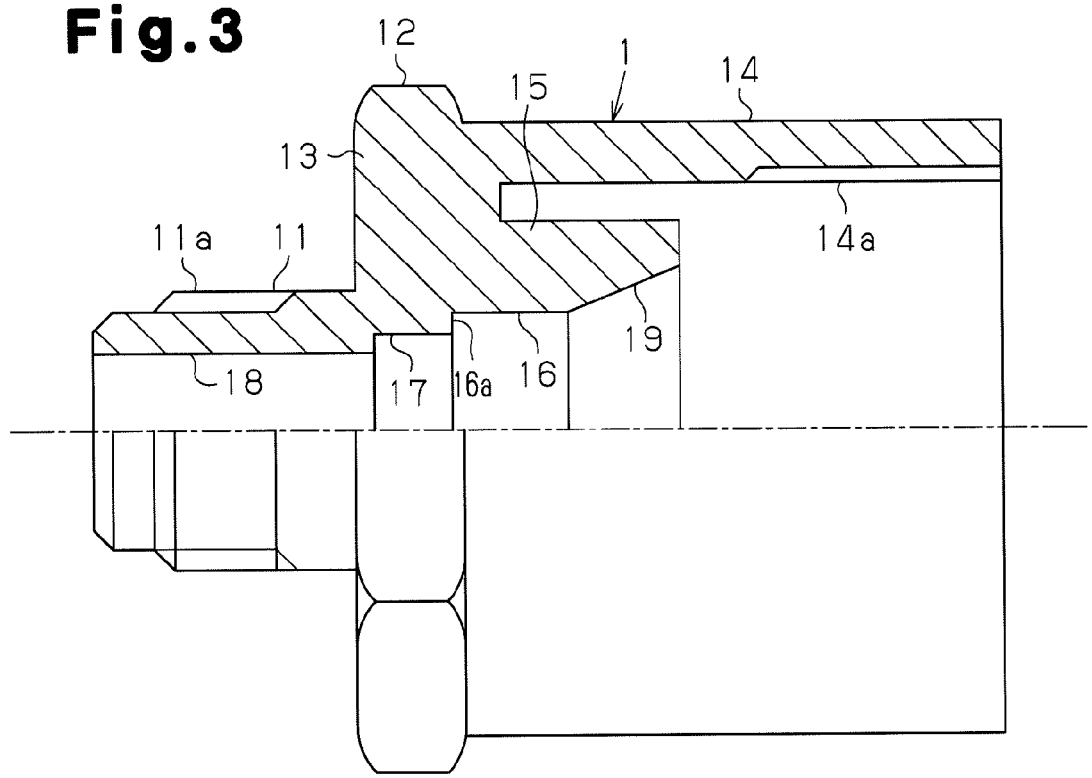
FIG. 3 is a cross-sectional view showing a portion of a joint body.

With reference to FIGS. 1 to 3, the joint body 1 has a base 13 and a tubular portion 14 arranged rearward with respect to the base 13. The base 13 has an attachment portion 11 attached to an interconnecting device, such as a closing valve, a container, or a pipe, and a nut portion 12, which is held by a fastening tool when the coupling member 2 is fastened. An internal thread 14a serving as a threaded portion to which the coupling member 2 is threaded is formed in the inner peripheral surface of the tubular portion 14. The joint body 1 includes a shaft portion 15 projecting from a rear end surface of the base 13 into the tubular portion 14. A pipe connecting port 16, into which a distal portion of the pipe p is inserted to a predetermined position when the pipe is joined, is formed in an axial portion from the shaft portion 15 to the base 13. Communicating holes 17, 18 are arranged forward with respect to the pipe connecting port 16. The pipe connecting port 16 and the communicating holes 17, 18 have mutually different diameters. An external thread 11a is formed in the outer peripheral surface of the attachment portion 11.

The diameter of the pipe connecting port 16 is set to a value substantially equal to the outer diameter of the pipe p in such a manner that the pipe p, which is to be joined, is passed through the pipe connecting port 16. A step (a counter bore) 16a is formed between the pipe connecting port 16 and the communicating hole 17. When the flareless-type pipe joint is assembled, the insertion position of the pipe p is maintained constant by causing the distal surface of the pipe p to contact the step 16a.

A cam surface 19 is formed at the inlet of the pipe connecting port 16. The cam surface 19 extends continuously from the pipe connecting port 16 at the front end and is formed in a conical (tapered) shape with a diameter becoming greater toward the rear end. The inclination angle of the cam surface 19 with respect to the axis of the pipe joint is greater than the inclination angle of a tapered surface 32 formed at the distal portion of the ferrule 3, which will be explained later.

With reference to FIGS. 1, 2, and 4 to 6, the coupling member 2 includes a cylindrical base 22 and a protection tube 23, which is arranged forward with respect to the base 22 and protects the outer periphery of the ferrule 3. The base 22 has a through hole 21, which allows the pipe p to extend through the axial center of the base 22. An external thread 22a serving as a threading portion threaded to the joint body 1 is formed at the outer periphery of the base 22, which is formed continuously from the protection tube 23. A holding portion 24, which has an external size greater than the external size of a front portion of the base 22 and is shaped in a hexagonal nut-like shape in such a manner as to allow a fastening tool to hold the coupling member 2, is formed in a rear portion of the base 22.

Figure 4:
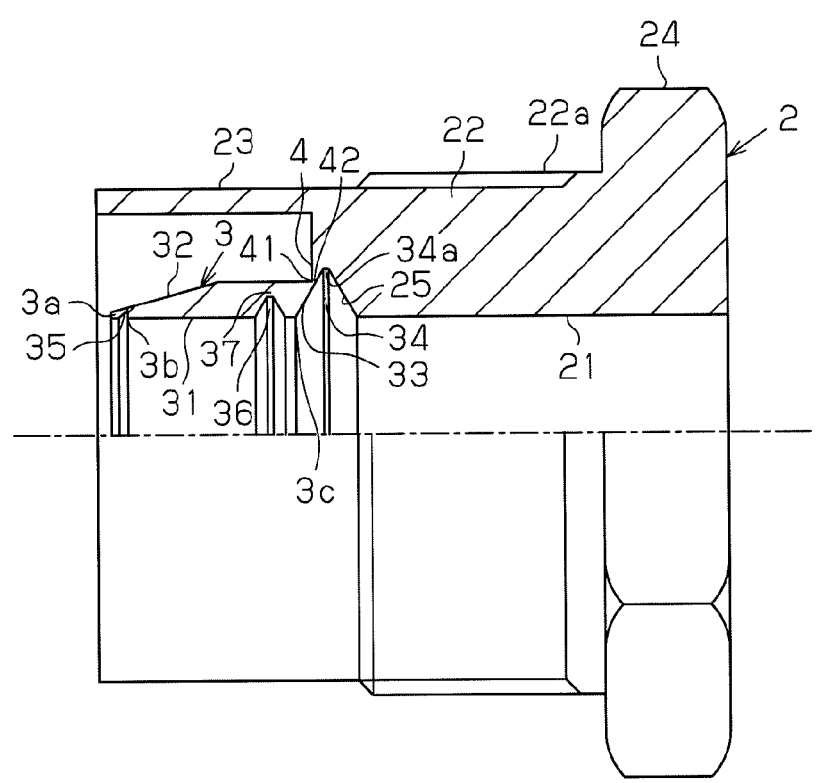
FIG. 4 is a cross-sectional view showing a portion of a coupling member.

An annular ferrule 3, which projects forward from the base 22, or toward the joint body 1, in the protection tube 23, is formed in the coupling member 2. A through hole 31, through which the pipe p is passed, extends through the axial center of the ferrule 3. The diameter of the through hole 31 is substantially equal to the diameter of the pipe connecting port 16 and the diameter of the through hole 21 extending through the axial center of the base 22. As illustrated in FIG. 4, the ferrule 3 has an annular shape and is connected to the base 22 through a thin portion 4, which extends in a radial direction of the coupling member 2 (the base 22) at a rear end portion of the ferrule 3, and thus formed integrally with the coupling member 2.

Figure 5:
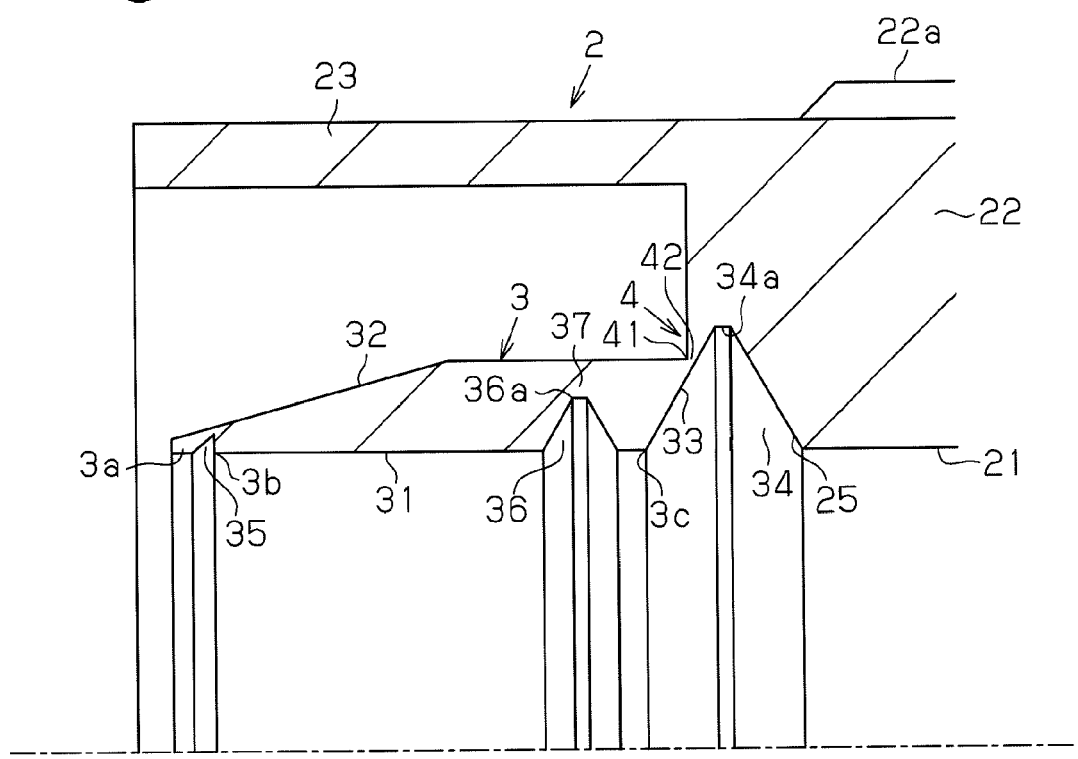
FIG. 5 is an enlarged cross-sectional view showing the vicinity of a ferrule.

With reference to FIG. 5, in a cross-section along the axial direction, a rear portion of the ferrule 3 has a substantially uniform thickness and the tapered surface 32 is formed on the outer peripheral surface of a front portion of the ferrule 3 in such a manner that the thickness of the ferrule 3 becomes smaller toward the distal end of the ferrule 3. The inclination angle of the tapered surface 32 is slightly smaller than the inclination angle of the cam surface 19. A rear end surface 33 of the ferrule 3 is opposed to a pressing surface 25 formed in the base 22 through a space 34, which extends outward in a radial direction of the base 22 from the inner periphery of the base 22. The space 34 is defined in a substantial V shape that projects outward as viewed in the axial cross section. A short linear portion 34a, which extends in the axial direction of the base 22, is formed at the point of the space 34. The space 34 causes the rear end surface 33 of the ferrule 3 serving as a front surface defining the space 34 to incline forward toward the axis of the ferrule 3 and the pressing surface 25 serving as a rear surface defining the space 34 to incline rearward towards the axis of the base 22.

The outer peripheral surface of the rear portion of the ferrule 3 is connected to the front surface of the thin portion 4 in a substantially perpendicular manner as viewed in the axial cross section. Accordingly, as viewed in the cross section configured by the rear end surface 33 extending from the ferrule 3 to the thin portion 4, the outer peripheral surface of the rear portion of the ferrule 3 having the cylindrical shape, and the front surface of the thin portion 4, the outer peripheral surface of the rear portion of the ferrule 3 and the front surface of the thin portion 4 form a cutout having an edge-like distal end 41, which extends toward the rear end surface 33. The cutout forms a thinnest portion 42 with a locally decreased thickness at the position at which the rear portion of the ferrule 3 and the thin portion 4 are connected together. When axial force acts on the coupling member 2, stress concentrates on the thinnest portion 42.

Figure 6A:
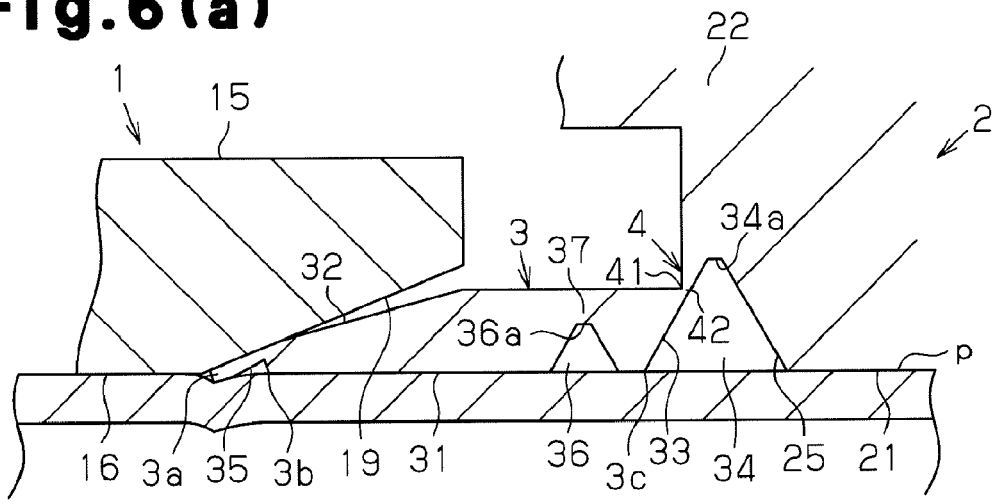
FIGS. 6(a), 6(b), and 6(c) are views illustrating pipe joining steps, where
Figure 6B:
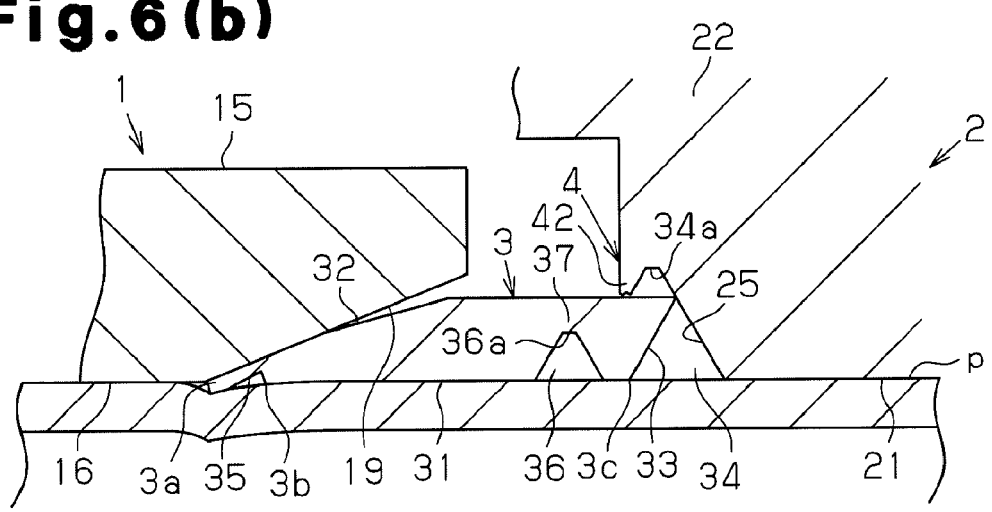
Figure 6C:
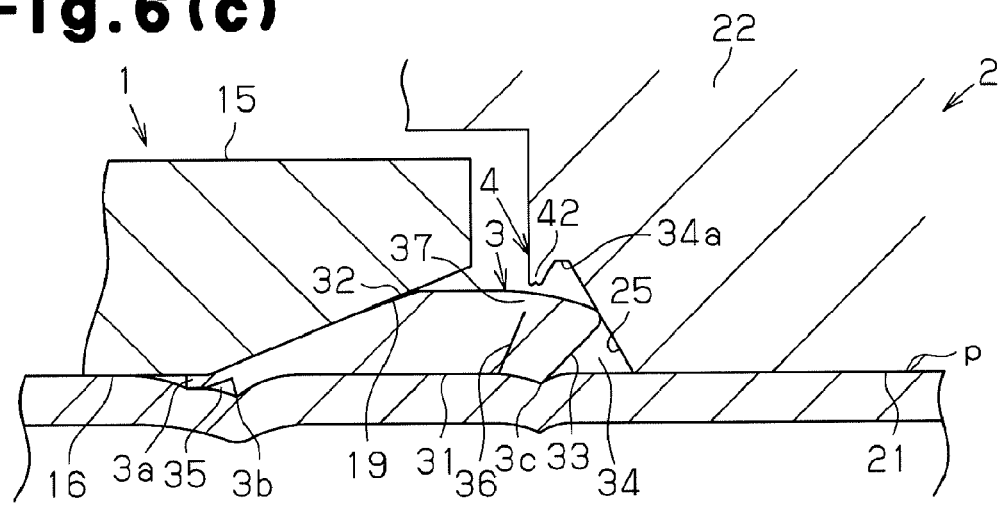

A cutout 35, which facilitates deformation of the distal portion of the ferrule 3, is arranged in the inner peripheral surface of the ferrule 3 near the distal end. When the coupling member 2 is manually fastened, a wedge-like portion 3a, which is formed with a small thickness and at a position forward with respect to the cutout 35, is pressed between the pipe p and the pipe connecting port 16 in a wedge-like manner. The pipe p is thus temporarily held. Sealing by the ferrule 3 is brought about by causing an edge portion 3b, which is formed rearward with respect to the cutout 35, to bite into the pipe p, as illustrated in FIGS. 6(*a*) to 6(*c*).

A large and substantially V-shaped groove 36, which divides the ferrule 3 into two parts, is formed in the inner peripheral surface of the ferrule 3 in the vicinity of the rear end surface 33. The groove 36 is shaped identically with the portion of the space 34 forming the point. The groove 36 forms an annular thin portion 37 between the bottom (which is, the pointed portion) of the groove 36 and the outer peripheral surface of the rear portion of the ferrule 3. As illustrated in FIG. 6(*c*), the annular thin portion 37 allows the edge portion 3b, which is located at the distal end of the ferrule 3, and an edge portion 3c forming the inner periphery of the rear end surface 33 to be deformable and bite into the pipe p. Deformation of the edge portion 3c in such a manner as to bite into the pipe p holds the pipe p against separation, and prevents vibration from being transmitted to the edge portion 3b through the pipe p. Accordingly, pipe sealing function and pipe holding function of the edge portion 3b are maintained at high levels.

A method for joining a pipe using the flareless-type pipe joint, which is configured as described above, will now be explained.

Before joining the pipe p with the joint body 1, the joint body 1 is attached to a prescribed device such as a pipe, a container, or a closing valve. To join the pipe using the flareless-type pipe joint, the pipe p is passed through the through hole 21 of the coupling member 2 and the coupling member 2 is arranged around the pipe p. Subsequently, as illustrated in FIG. 1, the distal portion of the pipe p is inserted into the pipe connecting port 16 via the through hole 31 of the ferrule 3. The distal surface of the pipe p thus contacts the step 16a and the coupling member 2 is threaded to the joint body 1.

Next, by manually fastening the coupling member 2, the wedge-like portion 3a of the ferrule 3 is pressed between the pipe p and the pipe connecting port 16, and the pipe p is temporarily held. After this stage, the rear portion of the cutout 35 of the ferrule 3 is held in contact with the cam surface 19. This increases the rotational torque necessary for fastening the coupling member 2. Accordingly, in the subsequent steps, the coupling member 2 is fastened to the joint body 1 using a fastening tool. This fastens the coupling member 2 with the distal portion of the ferrule 3 pressed against the cam surface 19, as in the case of the conventional example. As a result, axial forward force acts on the thin portion 4. At this stage, stress concentrates on the thinnest portion 42 having the portion at which the outer peripheral surface of the ferrule 3 and the front surface of the thin portion 4 meet, that is, the edge-like distal end 41 (see FIG. 6(*a*)). This cuts the thin portion 4 at the thinnest portion 42 as illustrated in FIG. 6(*b*), and the outer peripheral end of the rear end surface 33 contacts the pressing surface 25.

This separates the ferrule 3 from the coupling member 2, as has been described, and the outer peripheral end of the rear end surface 33 is pressed by the pressing surface 25. After this stage, the ferrule 3 operates as a ferrule independent from the other components. Specifically, when the coupling member 2 is further fastened in the state in which the outer peripheral end of the rear end surface 33 is pressed by the pressing surface 25, the pressing surface 25, which inclines rearward toward the axis of the base 22, facilitates deformation of the front and rear portion of the ferrule 3 with respect to the groove 36 toward the axis of the base 22. As a result, with reference to FIG. 6(*c*), the front portion of the ferrule 3 with respect to the groove 36 inclines about the groove 36 in such a manner that the edge portion 3b bites into the pipe p. The rear portion of the ferrule 3 with respect to the groove 36 inclines about the groove 36 in such a manner that the edge portion 3c at the inner periphery of the rear end surface 33 bites into the pipe p.

In the ferrule 3 of the first embodiment, the groove 36 is shaped in such a manner that, when the rear portion of the ferrule 3 is being deformed about the groove 36 and the biting amount of the edge portion 3c reaches an appropriate amount, the front surface and the rear surface defining the groove 36 contact each other substantially at the entire surfaces. As illustrated in an enlarged state in FIG. 5, the groove 36 has a substantial V shape identical to the shape of the point of the space 34. A short linear portion 36a, which extends substantially along the axis of the ferrule 3, is formed at the bottom of the groove 36. In other words, the groove 36 has a trapezoidal shape. Accordingly, in the first embodiment, inclination of the ferrule 3 about the groove 36 is restricted after the front and rear surfaces defining the groove 36 contact each other substantially at the entire surfaces. This prevents excessive biting of the edge portion 3c.

Figure 7A:
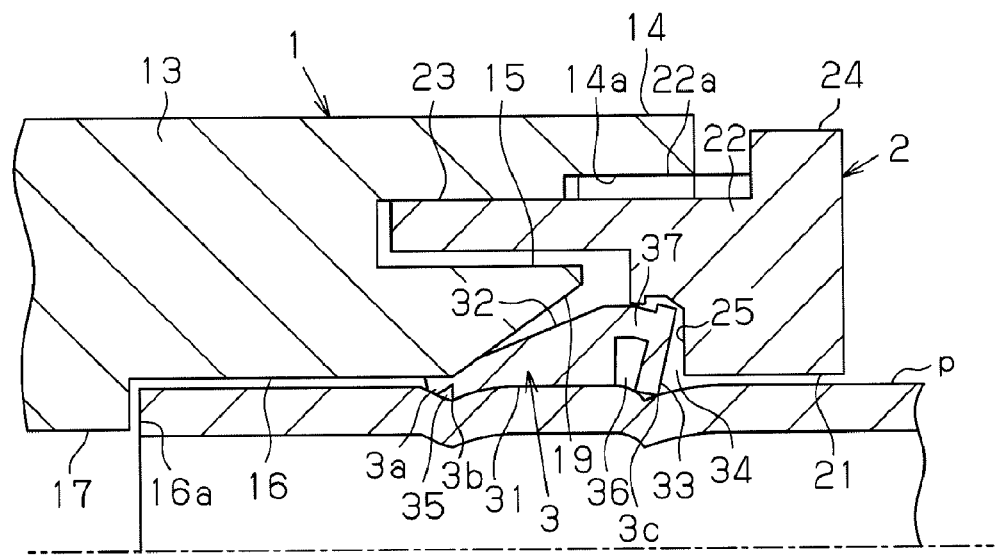
FIGS. 7(a) and 7(b) are views illustrating pipe joining steps of the flareless-type pipe joint, where
Figure 7B:
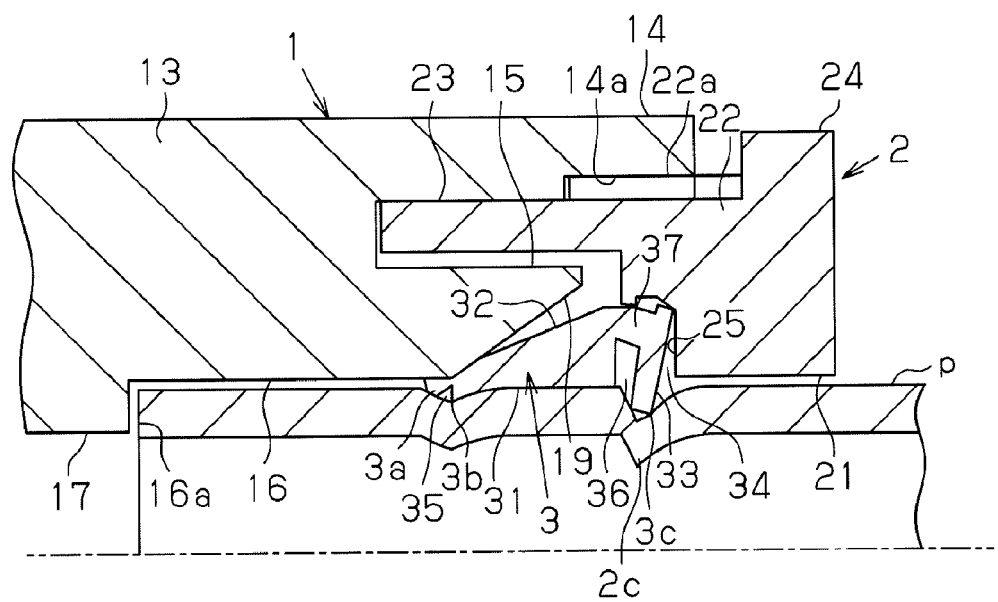

FIGS. 7(*a*) and 7(*b*) are views schematically illustrating fastening steps of a ferrule configured differently from the ferrule of the first embodiment. Using this example, the reason why the front surface and the rear surface defining the groove 36 are brought into contact with each other substantially at the entire surfaces in the fastening steps will be hereafter explained. FIG. 7(*a*) is a view illustrating a state in which the biting amount of the edge portion 3c reaches the appropriate amount in the fastening steps. FIG. 7(*b*) illustrates a state after fastening. In this ferrule 3, as illustrated in FIG. 7(*a*), the front surface and the rear surface defining the groove 36 are maintained separate from each other without contacting, when the biting amount of the edge portion 3c reaches the appropriate amount. Accordingly, as the coupling member 2 is further fastened, the rear portion of the ferrule 3 is deformed about the groove 36 in such a manner as to incline more. This causes the edge portion 3c to further bite into the pipe p, as illustrated in FIG. 7(*b*). As a result, the biting amount is increased compared to the first embodiment, and a deformed portion 2c biting into the pipe p is enlarged. This may increase the flow resistance of the refrigerant in the pipe p. In contrast, in the flareless-type pipe joint of the first embodiment, further inclination of the rear portion of the ferrule 3 is restricted by contact between the front surface and the rear surface forming the groove 36 substantially at the entire surfaces, thus preventing excessive biting of the edge portion 3c. As a result, the flareless-type pipe joint of the first embodiment prevents increase of the flow resistance of the refrigerant in the pipe p.

As has been described, in the case of the flareless-type pipe joint of the first embodiment, the edge portion 3b is deformed to bite into the pipe p while biting of the edge portion 3c into the pipe p is adjusted in such a manner that the biting amount of the edge portion 3c becomes an appropriate value. This seals the outer peripheral surface of the pipe p by the edge portion 3b of the ferrule 3 and holds the pipe p at the distal portion of the ferrule 3. Further, the tapered surface 32 of the ferrule 3 is pressed against the cam surface 19 to seal the gap between the cam surface 19 and the tapered surface 32 of the ferrule 3. At the rear end portion of the ferrule 3, retaining function of the pipe p is exerted by the edge portion 3c that bites into and holds the pipe p. As a result, the edge portion 3c absorbs vibration transmitted through the pipe p, thus preventing the vibration from being transmitted to the biting portion of the edge portion 3b. This maintains the sealing effect of the edge portion 3b at a high level.

With reference to FIG. 2, when biting of the edge portion 3b at the distal portion of the ferrule 3 and biting of the edge portion 3c at the rear end portion of the ferrule 3 reach predetermined amounts, the rotational torque required for fastening the coupling member 2 reaches a predetermined value. This completes fastening of the pipe p.

The flareless-type pipe joint of the first embodiment has the following advantages.

(1) The ferrule 3 has the groove 36, which extends radially outward from the inner periphery of the ferrule 3 in such a manner as to divide the ferrule 3 into two parts. The annular thin portion 37 is formed between the bottom of the groove 36 and the outer peripheral surface of the ferrule 3. The ferrule 3 is pressed axially with the pressing surface 25 pressing the rear end portion of the ferrule 3 toward the inner periphery (the axis) of the ferrule 3. This facilitates deformation of the front portion of the ferrule 3 about the groove 36 in the direction in which the distal portion bites into the pipe p, and deformation of the rear portion of the ferrule 3 about the groove 36 in the direction in which the rear end portion bites into the pipe p. Accordingly, in the flareless-type pipe joint of the first embodiment, by pressing the rear end portion of the ferrule 3 by means of the pressing surface 25 in the axial direction and toward the inner periphery of the ferrule 3, the edge portion 3b and the edge portion 3c, which are formed in the distal portion and the rear end portion of the ferrule 3, respectively, are each deformed in such a manner as to bite into the pipe p. Accordingly, vibration and impact transmitted through the pipe p is attenuated by the biting portion of the rear end portion of the ferrule 3 before reaching the biting portion of the distal portion of the ferrule 3. As a result, the pipe sealing function and the pipe holding function through biting of the distal portion of the ferrule 3 are reliably maintained by the pipe holding function through biting of the rear end portion of the ferrule 3.

(2) The space 34 is defined between the rear end surface of the ferrule 3 and the pressing surface 25. The rear end portion of the ferrule 3 is connected integrally to the base 22 of the coupling member 2, in which the cam surface 19 is not provided, through the extending radially thin portion 4. When the joint body 1 and the coupling member 2 are fastened together, the axial force produced by fastening the joint body 1 and the coupling member 2 together cuts the thin portion 4 after the distal portion of the ferrule 3 contacts the cam surface 19. After the thin portion 4 is cut, the ferrule 3 operates as an independent ferrule. Accordingly, in the flareless-type pipe joint of the first embodiment, the ferrule 3 is used as the pipe joint with which the ferrule 3 is formed integrally and ensures the advantage (1). Specifically, since the edge portions 3b, 3c, which are arranged in the distal portion and the rear end portion of the inner peripheral surface of the ferrule 3, both bite into the pipe p, the vibration and the impact transmitted through the pipe p is attenuated by the biting portion of the rear end portion of the ferrule 3 before reaching the biting portion of the distal portion of the ferrule 3. As a result, the pipe holding and pipe sealing functions through biting of the distal portion of the ferrule 3 are reliably maintained by the pipe holding function through biting of the rear end portion of the ferrule 3.

(3) The groove 36 is formed in such a manner that, when the edge portion 3b of the distal portion of the ferrule 3 and the edge portion 3c of the rear end portion of the inner peripheral surface of the ferrule 3 are deformed to bite into the pipe, the front surface and the rear surface defining the groove 36 contact each other substantially at the entire surfaces. Accordingly, such contact caused in deformation of the ferrule 3 prevents excessive deformation of the rear end portion of the ferrule 3. As a result, the edge portion 3c of the rear end portion of the ferrule 3 is prevented from excessively biting, thus suppressing increase of the refrigerant flow resistance due to the excessive deformation of the edge portion 3c toward the inner surface of the pipe p.

(4) The ferrule 3 includes the cutout 35, which deforms the distal portion of the ferrule 3 easily by the axial pressing force produced by manually fastening the joint body 1 and the coupling member 2 together. By pressing the wedge-like portion 3a, which is arranged forward with respect to the cutout 35, between the outer peripheral surface of the pipe p to be joined and the inner peripheral surface of the pipe connecting port 16 or deforming the wedge-like portion 3a in such a manner as to bite into the surface of the pipe p, the pipe p is temporarily held before the coupling member 2 must be fastened by a fastening tool. Accordingly, afterwards, the coupling member 2 is fastened efficiently using the fastening tool.

(5) The outer peripheral surface of the ferrule 3, which projects forward with respect to the base 22 of the coupling member 2, is protected by the protection tube 23. This prevents the ferrule 3 from being damaged when the components are stored before the pipe is joined.

(6) In the thin portion 4 connecting the ferrule 3 to the base 22 of the coupling member 2, the cutout having the edge-like distal end 41 forms the thinnest portion 42 with the thickness that is decreased locally. Stress concentrates on the thinnest portion 42. As a result, the thin portion 4 is cut easily at the portion corresponding to the thinnest portion 42.

(7) In a refrigerating device in which the flareless-type pipe joint of the first embodiment is employed in at least one of a refrigerant circuit and a water supply circuit, and a water-heating device in which the flareless-type pipe joint is used in at least one of a hot water supply circuit and a water supply circuit, pipe joint function with improved air-tightness and enhanced durability is obtained, and the sealing performance and the durability of the pipe joint are improved. The reliability of the product is thus improved.

Second Embodiment

A second embodiment of the present invention will now be described with reference to FIG. 8. In the second embodiment, the shape of the space 34 and the shape of the cutout formed in the thin portion 4 are modified from the corresponding parts of the first embodiment.

Figure 8:
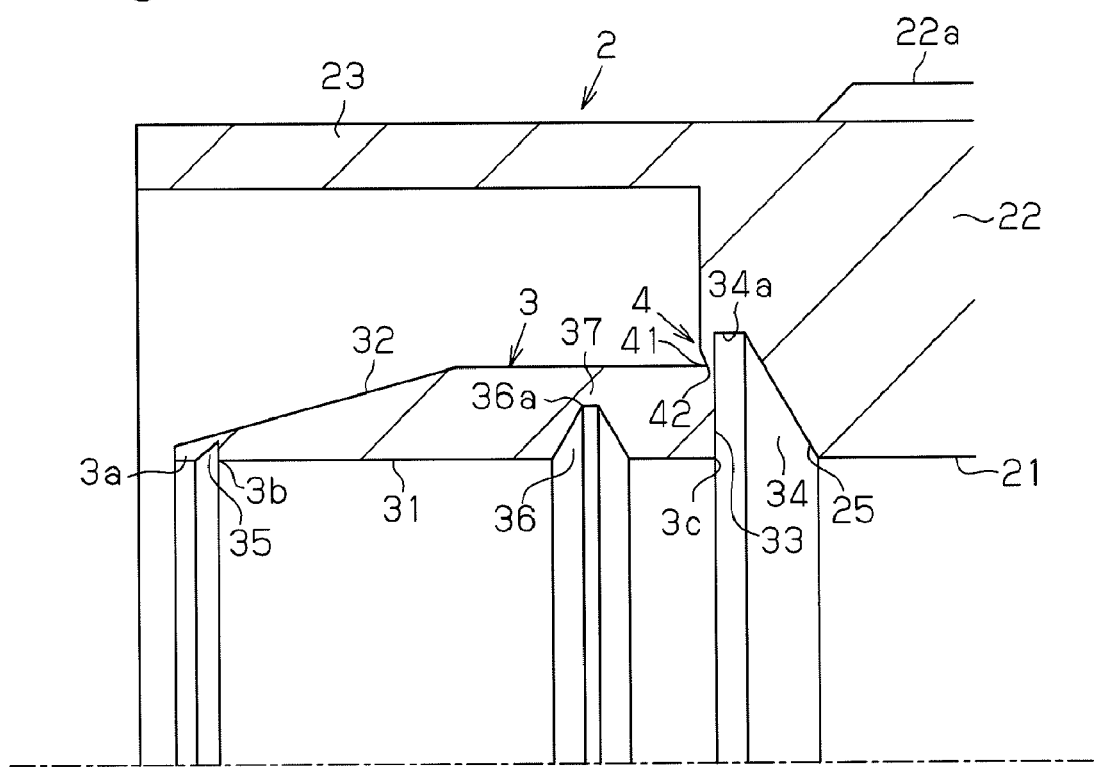
FIG. 8 is an enlarged cross-sectional view showing the vicinity of a ferrule of a flareless-type pipe joint according to a second embodiment of the present invention.

The ferrule 3 of the second embodiment is basically identical with the ferrule 3 of the first embodiment but is different from the ferrule 3 of the first embodiment, as illustrated in FIG. 8, in that the front surface defining the space 34, or the rear end surface 33 extending from the thin portion 4 to the ferrule 3, extends perpendicularly to the axis of the ferrule 3. Since the rear end surface 33 serving as a flat surface defining the space 34 is shaped differently from the rear end surface 33 of the first embodiment, a triangular cutout is formed in a range from the front surface of the thin portion 4 toward the rear end surface 33 in order to form the thinnest portion 42.

The components of the flareless-type pipe joint of the second embodiment other than the above-described components are identical with the corresponding components of the first embodiment. Accordingly, the second embodiment has the following advantage in addition to the advantages (1) to (7).

(8) The flat surface defining the space 34 extends perpendicularly to the axis of the ferrule 3. The edge portion 3c thus bites effectively compared to the case of the first embodiment.

Third Embodiment

A third embodiment of the present invention will hereafter be explained with reference to FIGS. 9 and 10. In the third embodiment, the shape of the space 34, which is defined rearward with respect to the ferrule 3, and the threading structure between the joint body 1 and the coupling member 2 are changed from the corresponding parts of the first embodiment.

Figure 9:
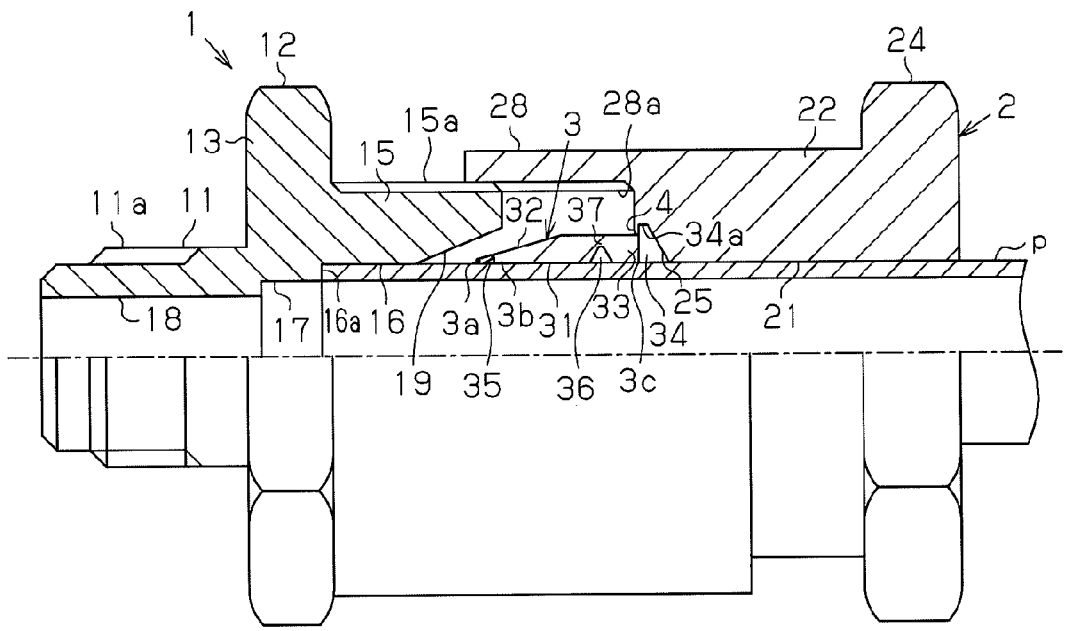
FIG. 9 is a cross-sectional view showing a portion of a flareless-type pipe joint according to a third embodiment of the present invention, illustrating an assembled state before fastening.
Figure 10:
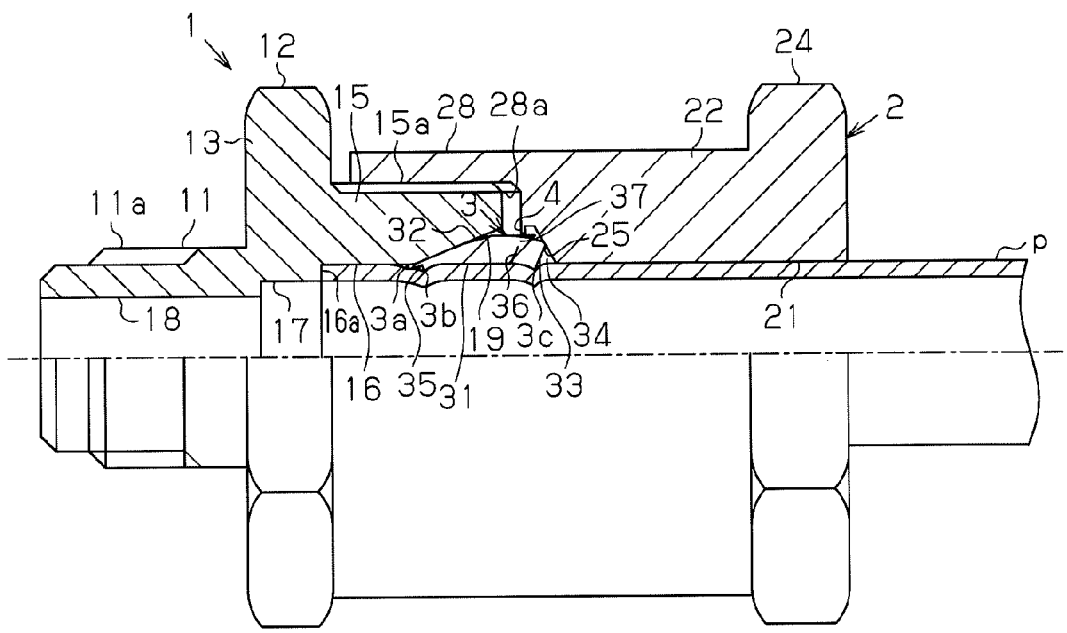
FIG. 10 is a cross-sectional view showing a portion of the flareless-type pipe joint, illustrating a state after fastening.

With reference to FIGS. 9 and 10, the shape of the space 34 of the third embodiment, which is defined rearward with respect to the ferrule 3, is identical with that of the second embodiment. Specifically, the rear end surface 33 extending from the thin portion 4 to the ferrule 3 is arranged perpendicularly to the axis of the ferrule 3. Since the rear end surface 33 extends perpendicularly to the axis in this manner, the edge portion 3c of the rear portion of the ferrule 3 bites effectively compared to the case of the first embodiment.

The threading structure between the joint body 1 and the coupling member 2 will now be explained. The tubular portion 14 of the first embodiment is omitted from the joint body 1, and an external thread 15a is formed on the outer periphery of the shaft portion 15. The protection tube 23 of the first embodiment is omitted from the third embodiment, and a tubular internal thread portion 28 is arranged forward with respect to the base 22. The external thread 22a on the outer periphery of the base 22 is omitted, and an internal thread 28a to be threaded to the external thread 15a of the joint body 1 is formed on the inner peripheral surface of the tubular internal thread portion 28. The tubular internal thread portion 28 protects the outer periphery of the ferrule 3 instead of the protection tube 23 of the first embodiment. As a result, the flareless-type pipe joint of the third embodiment has the advantages (1) to (4), (6), and (7).

Fourth Embodiment

A fourth embodiment of the present invention will now be described with reference to FIGS. 11 and 12. In the fourth embodiment, the shape of the space 34 defined rearward with respect to the ferrule 3 is modified from that of the first embodiment. The components of the fourth embodiment other than the space 34 are identical with the corresponding components of the first embodiment.

Figure 11:
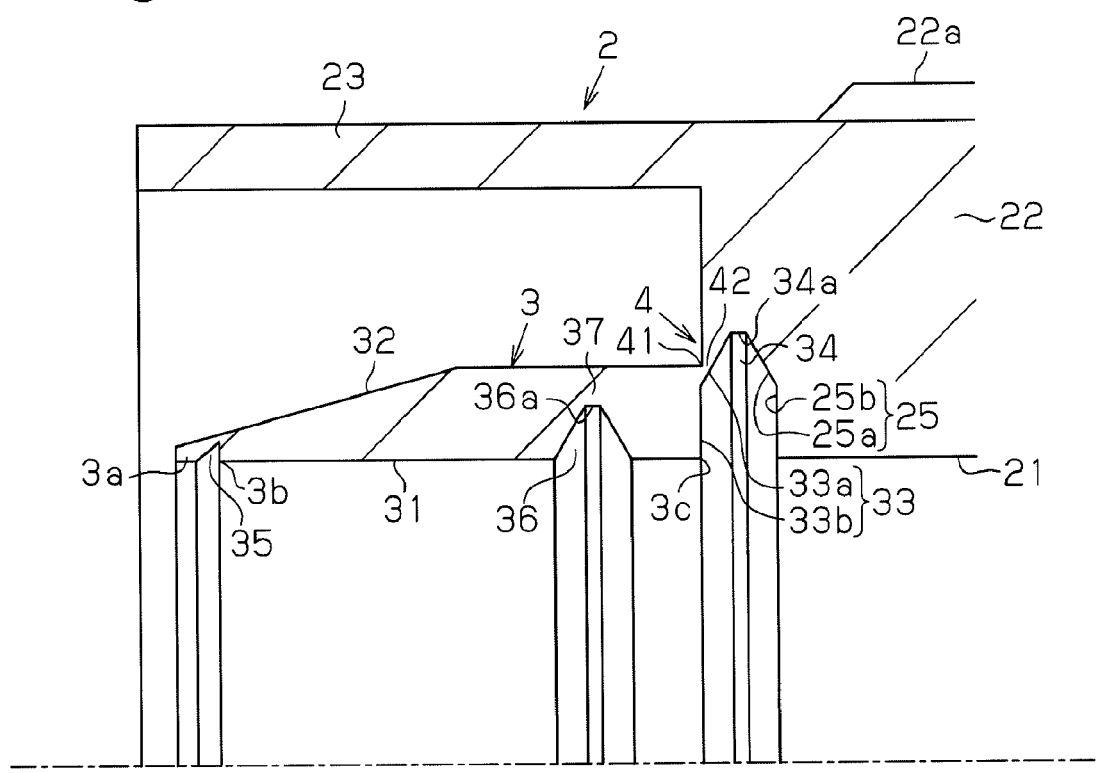
FIG. 11 is an enlarged cross-sectional view showing the vicinity of a ferrule of a flareless-type pipe joint according to a fourth embodiment of the present invention.

As illustrated in FIG. 11, in the fourth embodiment, the point of the space 34 located rearward with respect to the ferrule 3, that is, a radially outer portion of the space 34, is formed in a V shape identical with the shape of the groove 36. Front and rear surfaces defining a radially inner portion of the space 34 extend perpendicularly to the axis of the ferrule 3.

Accordingly, in the pressing surface 25 serving as the rear surface defining the space 34, a radially outer portion 25a is formed as a slanted surface and a radially inner portion 25b is formed as a perpendicular surface extending perpendicularly to the axis. The slanted surface of the radially outer portion 25a is slanted toward the inner periphery of the ferrule 3 along a rearward direction. This configuration is identical with the corresponding structure of the first embodiment. The slanted surface of the radially outer portion 25a is configured in such a manner that, after the ferrule 3 is cut at the thinnest portion 42, the slanted surface contacts the rear end portion of the ferrule 3. The pressing surface 25 of the fourth embodiment presses the outer peripheral end of the ferrule 3 at the radially outer portion 25a until a certain stage of the fastening procedure of the coupling member 2. However, after this stage, the radially inner portion 25b, which is formed by the perpendicular surface extending perpendicularly to the axis, presses the outer peripheral end of the ferrule 3.

In the rear end surface 33 of the ferrule 3 serving as the front surface defining the space 34, a radially outer portion 33a including the portion opposed to the cutout is formed as a slanted surface, and a radially inner portion 33b is formed as a perpendicular surface extending perpendicularly to the axis of the ferrule 3. Accordingly, the perpendicular joint portion formed by the outer peripheral surface of the rear portion of the ferrule 3 and the front surface of the thin portion 4 forms a cutout opposed to the rear end surface 33 extending from the thin portion 4 to the ferrule 3, as in the first embodiment. The thinnest portion 42 is provided at the position corresponding to the cutout. The edge portion 3c, which forms the inner periphery of the rear end surface 33, is formed have a right angle.

Figure 12A:
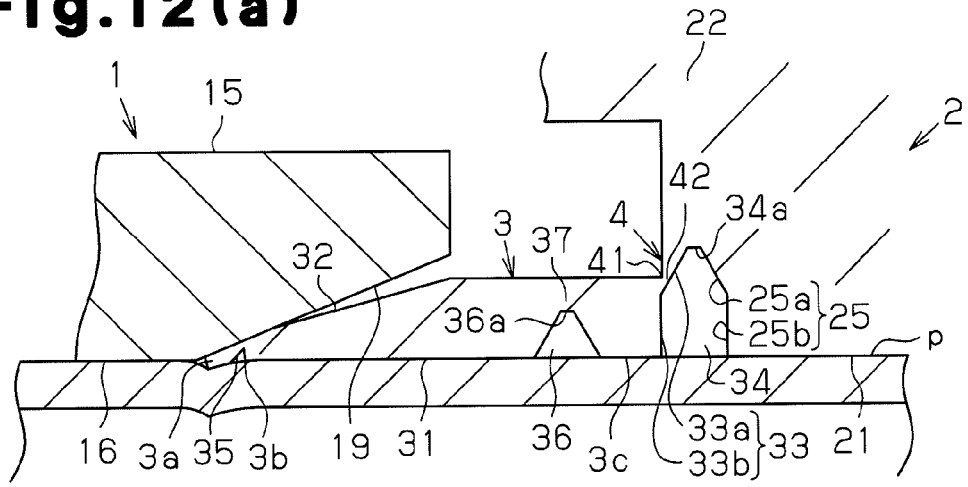
FIGS. 12(a), 12(b), and 12(c) are diagrams illustrating pipe joining steps, where
Figure 12B:
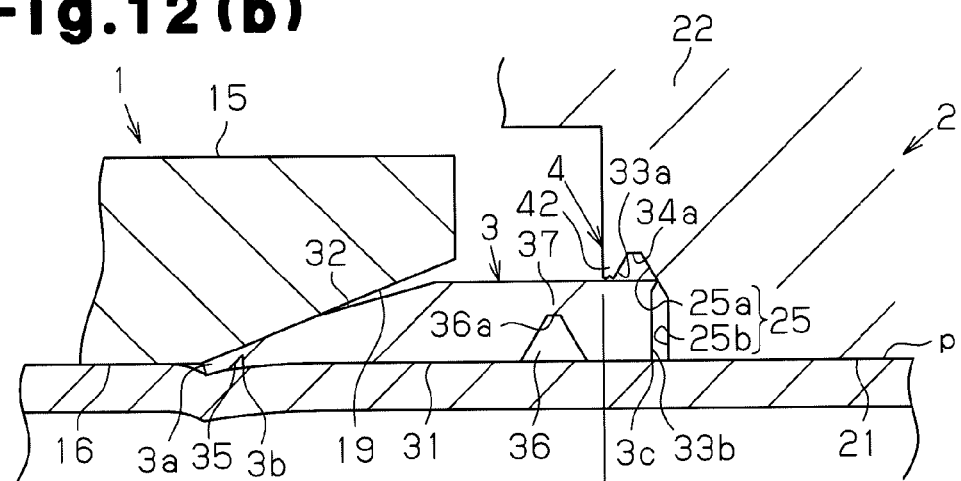
Figure 12C:
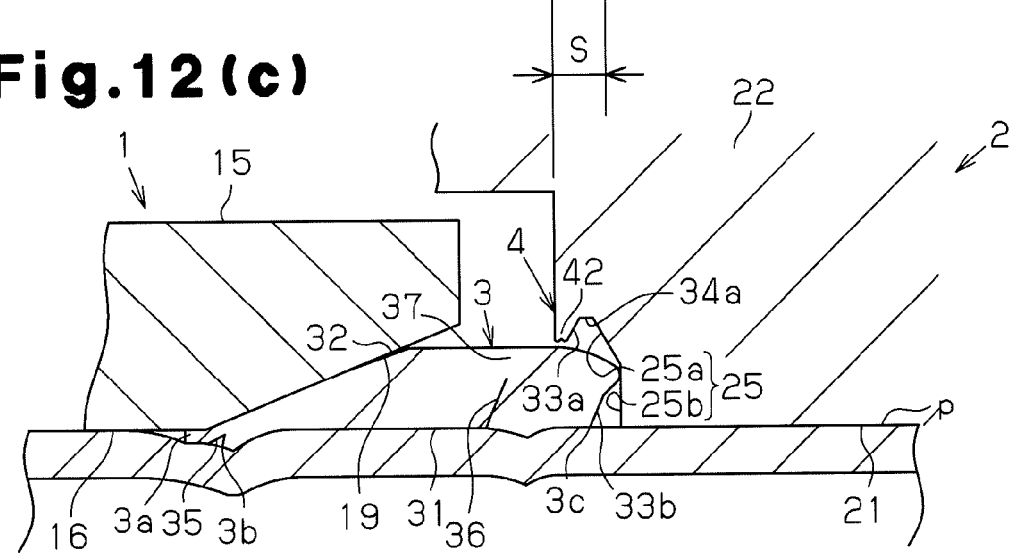

In the flareless-type pipe joint of the fourth embodiment, which is configured as described above, the pipe p is joined as illustrated in FIGS. 12(a) to 12(c). Specifically, as in the first embodiment, the coupling member 2 is arranged around the pipe p and the distal portion of the pipe p is passed through the pipe connecting port 16 via the through hole 31 of the ferrule 3. Then, as illustrated in FIG. 12(a), the coupling member 2 is fastened manually so that the pipe p is temporarily held. The state illustrated in FIG. 12(a) is the same as the state of the first embodiment illustrated in FIG. 6(a), except that the shape of the space 34 is modified.

Subsequently, by fastening the coupling member 2 to the joint body 1 using a fastening tool, the ferrule 3 is cut at the thinnest portion 42 and the radially outer portion 25a of the pressing surface 25 contacts the rear end surface 33 of the ferrule 3 as illustrated in FIG. 12(b). The state illustrated in FIG. 12(b) corresponds to the state of the first embodiment illustrated in FIG. 6(b).

Next, by further fastening the coupling member 2 using the fastening tool, the radially outer portion 25a of the pressing surface 25 formed by the slanted surface presses the outer peripheral end of the ferrule 3. Accordingly, as in the first embodiment, the front and rear portions of the ferrule 3 each incline about the groove 36 to bite into the pipe p, and the edge portion 3b of the front portion and the edge portion 3c of the rear portion bite into the pipe p. In the fourth embodiment, the surface pressing the outer peripheral end of the ferrule 3 is switched from the radially outer portion 25a, which is the slanted surface, to the radially inner portion 25b, which is the perpendicular surface extending perpendicularly to the axis of the ferrule 3. Before switching, the rear portion of the ferrule 3 inclines about the groove 36 and is deformed in such a manner that the edge portion 3c bites into the pipe p. However, after the switching, the rear portion of the ferrule 3 is deformed in such a manner as to bite into the pipe p while being pressed forward. Accordingly, with reference to FIG. 12(c), the front and rear surfaces of the groove 36 are deformed to contact each other quickly, compared to the case of the first embodiment. With reference to FIGS. 12(b) and 12(c), this shortens the movement distance S of the coupling member 2 from when the outer peripheral end initially contacts the radially outer portion 25a of the pressing surface 25 after the ferrule 3 has been cut to when the front and rear surfaces of the groove 36 contact each other.

The fourth embodiment has the following advantages in addition to the advantages (1) to (7).

(9) In the pressing surface 25 defining the space 34, the radially outer portion 25a is formed as a slanted surface, and the radially inner portion 25b is configured as a perpendicular surface extending perpendicularly to the axis of the ferrule 3. At a certain stage of the fastening procedure of the coupling member 2, the surface pressing the outer peripheral end of the ferrule 3 is switched from the radially outer portion 25a of the pressing surface 25 to the radially inner portion 25b. This shortens the movement distance S of the coupling member 2 from when the radially outer portion 25a of the pressing surface 25 initially contacts the outer peripheral end of the ferrule 3 to when the front and rear surfaces of the groove 36 contact each other, with reference to FIGS. 12(b) and 12(c). As a result, the fastening stroke of the coupling member 2 is decreased. This shortens the time needed for joining the pipe compared to the first embodiment.

(10) The size of the radially inner portion of the space 34 is small compared to that of the space 34 of the first embodiment. The pipe joint is thus reduced in size.

(11) The radially outer portion of the space 34 is shaped identically to the shape of the groove 36. The space 34 and the groove 36 may be formed through cutting using a common cutting tool (cutter).

(12) The edge portion 3c at the inner periphery of the rear end surface of the ferrule 3 is formed at a right angle. The edge portion 3c thus bites further effectively compared to the first embodiment.

Fifth Embodiment

Figure 13:
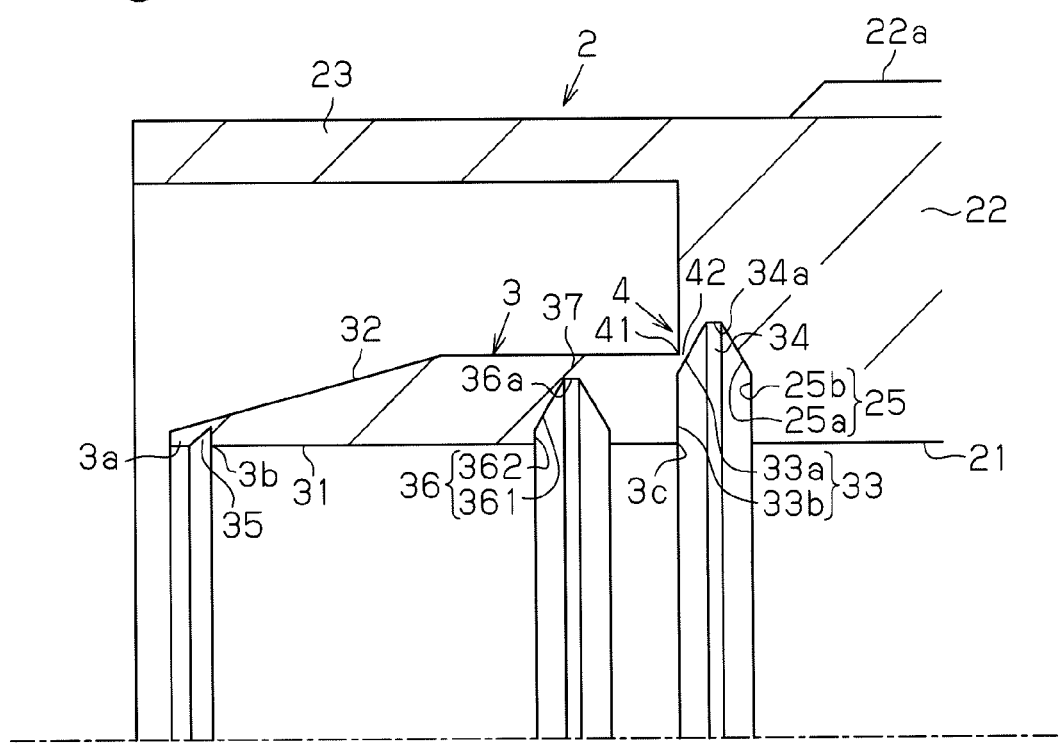
FIG. 13 is an enlarged cross-sectional view showing the vicinity of a ferrule of a flareless-type pipe joint according to a fifth embodiment of the present invention.
Figure 14A:
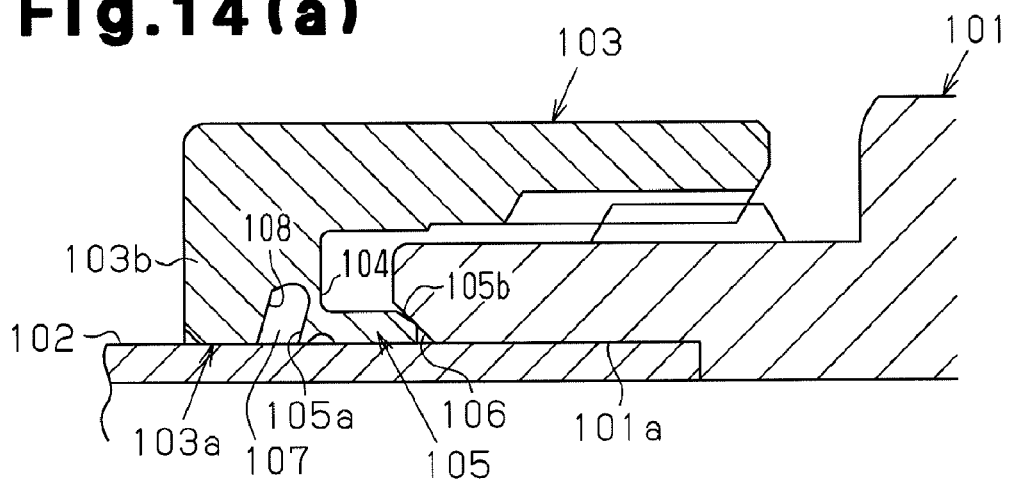
FIGS. 14(a), 14(b), and 14(c) are diagrams illustrating pipe joining steps of a conventional integral ferrule type flareless-pipe joint, where
Figure 14B:
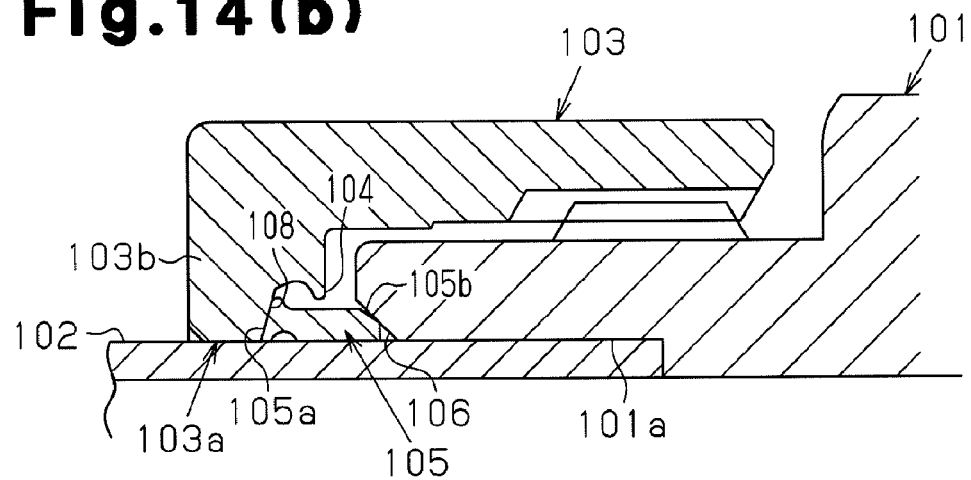
Figure 14C:
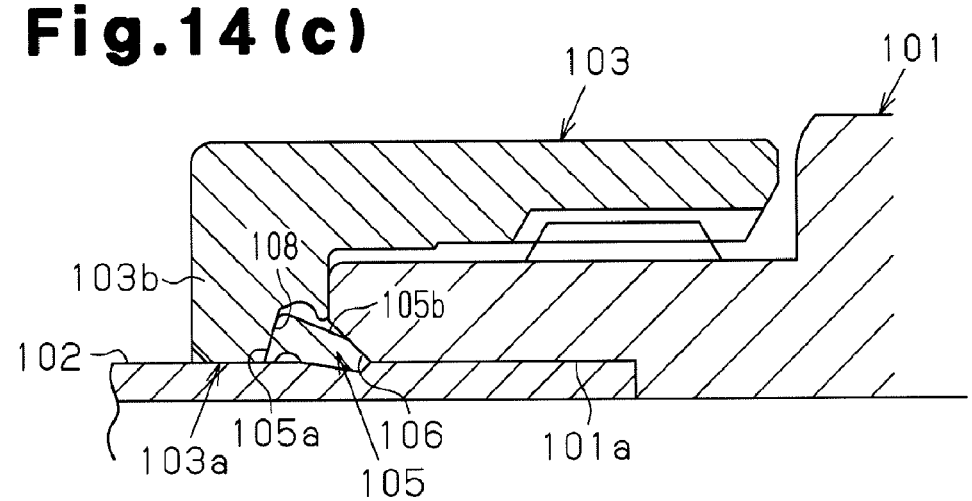

A fifth embodiment of the present invention will now be explained with reference to FIG. 13. In the fifth embodiment, the shape of the groove 36 is changed from that of the fourth embodiment. Specifically, the groove 36 of the fifth embodiment is shaped to meet the requirement of increasing the depth of the groove 36 in correspondence with modifications to the intent of the design or the specifications such as the material and the size of the pipe p to be joined or the material and the size of the ferrule 3.

The groove 36 is formed using a cutting tool like the cutting tool used in the fourth embodiment. As illustrated in FIG. 13, a radially outer portion 361, which is the point, of the groove 36 has the V shape identical to that of the groove 36 of the fourth embodiment. The front and rear surfaces forming a radially inner portion 362 are formed by flat surfaces extending perpendicularly to the axis. When it is necessary to increase the depth of the groove 36, the same advantages as those of the fourth embodiment are obtained by shaping the groove 36 in this manner.

Since the groove 36 of the fifth embodiment is shaped differently from the groove 36 of the fourth embodiment, the front surface and the rear surface defining the groove 36 are brought into contact with each other by fastening the coupling member 2 in a manner different from the corresponding manners of the first and fourth embodiments. Specifically, in the fifth embodiment, when the rear portion of the ferrule 3 is inclined about the groove 36 by fastening the coupling member 2, the inner peripheries of the front and rear surfaces defining the groove 36 first contact each other. This prevents the front and rear surfaces forming the groove 36 from contacting each other substantially at the entire surfaces. That is, contact between the inner peripheries stops inclination of the rear portion of the ferrule 3 and suppresses excessive biting of the edge portion 3c.

The illustrated embodiments may be modified as follows.

In each of the illustrated embodiments, the ferrule 3 and the coupling member 2 are formed as an integral body. However, the ferrule 3 may be formed independently from the joint body 1 and the coupling member 2.

In each of the illustrated embodiments, the ferrule 3 and the coupling member 2 are provided as an integral body and the cam surface 19 is formed in the joint body 1. However, the ferrule 3 and the joint body 1 may be formed integrally with each other and the cam surface 19 may be arranged in the coupling member 2. Further, the attachment position of the ferrule 3 is not particularly restricted and may be modified from the position in the base 22 of the coupling member 2.

In each of the illustrated embodiments, the cutout 35 is formed in the distal portion of the ferrule 3 and the groove 36 is arranged at the position of the inner peripheral surface of the ferrule 3 close to the rear end surface 33. The shape of the cutout 35 and the shape of the groove 36 are not particularly restricted and may be changed from the shapes of the illustrated embodiments. Also, the cutout 35 may be omitted.

In the first embodiment, the internal thread 14a is formed in the joint body 1 and the external thread 22a is provided in the coupling member 2. However, as described in the fourth embodiment, the external thread 15a may be arranged in the joint body 1 and the internal thread 28a may be formed in the coupling member 2. The specific structure of the threading portion between the joint body 1 and the coupling member 2 is not particularly restricted and may be modified from the threading structures of the illustrated embodiments.

In each of the illustrated embodiments, the cutout having the edge-like distal end 41 is formed in the front surface of the thin portion 4 in order to provide the thinnest portion 42 having the thickness decreased locally. However, the cutout may be arranged in the rear surface of the thin portion 4, if facilitation of manufacturing is not taken into consideration.

The invention claimed is:

1. A flareless-type pipe joint comprising a joint body having a pipe connecting port through which a pipe to be joined is passed, a coupling member fastened to the joint body, an annular ferrule, and a cam surface guiding a distal portion of the ferrule to bite into the pipe, wherein:

the cam surface is formed in at least one of the joint body and the coupling member;

a pressing surface is formed in the joint body or the coupling member in which the cam surface is not provided, the pressing surface pressing a rear end portion of the ferrule in an axial direction and toward an inner periphery of the ferrule;

the ferrule has a groove that extends outward in a radial direction from an inner periphery of the ferrule in such a manner as to divide the ferrule into a front portion and a rear portion;

the groove is shaped in such a manner that, when an edge portion of the distal portion of the ferrule and an edge portion of a rear end portion of an inner peripheral surface of the ferrule are being deformed to bite into the pipe, front and rear surfaces defining the groove contact each other at the entire surfaces or parts of the surfaces; and the distal portion of the ferrule is pressed against the cam surface by pressing the rear end portion of the ferrule in the axial direction and toward the inner periphery by means of the pressing surface, so that the edge portion formed in the distal portion of the ferrule and the edge portion provided in the rear end portion of the inner peripheral surface of the ferrule bite into the pipe.

2. The flareless-type pipe joint according to claim 1, wherein:

the rear end portion of the ferrule is connected integrally, through a radially extending thin portion, to a base of the joint body or the coupling member in which the cam surface is not provided;

a space is defined between a rear end surface of the ferrule and the pressing surface; and when the joint body and the coupling member are fastened together, the thin portion is cut by an axial force produced by fastening the joint body and the coupling member together after the distal portion of the ferrule contacts the cam surface, the ferrule operating as an independent ferrule after the thin portion is cut.

3. The flareless-type pipe joint according to claim 1, wherein the ferrule has a cutout that allows the distal portion of the ferrule to be easily deformed by an axial pressing force produced by manually fastening the joint body and the coupling member together, wherein, by pressing a wedge-like portion located distally with respect to the cutout into the pipe, the pipe to be joined is temporarily fixed.

4. A refrigerating device in which the flareless-type pipe joint according claim 1 is employed in a refrigerant circuit, in a water supply circuit, or in both of the refrigerant circuit and the water supply circuit.

5. A water-heating device in which the flareless-type pipe joint according to claim 1 is employed in a hot water supply circuit, in a water supply circuit, or in both of the hot water supply circuit and the water supply circuit.

* * * * *